(12) United States Patent
Petitdidier

(10) Patent No.: US 10,903,174 B2
(45) Date of Patent: Jan. 26, 2021

(54) ELECTRONIC CHIP

(71) Applicant: STMicroelectronics (Crolles 2) SAS, Crolles (FR)

(72) Inventor: Sebastien Petitdidier, La Terrasse (FR)

(73) Assignee: STMICROELECTRONICS (CROLLES 2) SAS, Crolles (FR)

( * ) Notice: Subject to any disclaimer, the term of this patent is extended or adjusted under 35 U.S.C. 154(b) by 0 days.

(21) Appl. No.: 16/043,289

(22) Filed: Jul. 24, 2018

(65) Prior Publication Data

US 2019/0035747 A1    Jan. 31, 2019

(30) Foreign Application Priority Data

Jul. 27, 2017 (FR) ...................... 17 57142

(51) Int. Cl.
| | |
|---|---|
| *H01L 23/00* | (2006.01) |
| *H01L 23/48* | (2006.01) |
| *G06F 21/87* | (2013.01) |
| *H01L 23/522* | (2006.01) |

(52) U.S. Cl.
CPC ............ *H01L 23/573* (2013.01); *G06F 21/87* (2013.01); *H01L 23/481* (2013.01); *H01L 23/5222* (2013.01); *H01L 23/576* (2013.01)

(58) Field of Classification Search
CPC ... H01L 23/573; H01L 23/481; H01L 23/576; H01L 23/5222; H01L 21/02697; G06F 21/87
See application file for complete search history.

(56) References Cited

U.S. PATENT DOCUMENTS

| | | |
|---|---|---|
| 7,884,625 B2 | 2/2011 | Bartley et al. |
| 8,946,859 B2 | 2/2015 | Lisart et al. |
| 2007/0045780 A1 | 3/2007 | Akram et al. |
| 2007/0121575 A1 | 5/2007 | Savry et al. |
| 2009/0001821 A1 | 1/2009 | Walker et al. |
| 2010/0155796 A1 | 6/2010 | Koike et al. |
| 2010/0181645 A1 | 7/2010 | Marenco |
| 2010/0187525 A1 | 7/2010 | Bartley et al. |
| 2010/0187527 A1 | 7/2010 | Van Geloven et al. |
| 2013/0168868 A1 | 7/2013 | Ho et al. |
| 2015/0108606 A1 | 4/2015 | Lamy et al. |
| 2016/0211230 A1 | 7/2016 | Lamy et al. |
| 2016/0307855 A1 | 10/2016 | Charbonnier et al. |
| 2018/0061781 A1 | 3/2018 | Petitdidier et al. |

FOREIGN PATENT DOCUMENTS

| | | |
|---|---|---|
| CN | 101636826 A | 1/2010 |
| CN | 103187379 A | 7/2013 |
| EP | 1427007 A2 | 6/2004 |
| EP | 2866259 A1 | 4/2015 |
| EP | 3046147 A2 | 7/2016 |
| JP | 2005277327 A | 10/2005 |

*Primary Examiner* — David Vu
(74) *Attorney, Agent, or Firm* — Slater Matsil, LLP

(57) ABSTRACT

An electronic chip includes a substrate made of semiconductor material. Conductive pads are located on a front side of the substrate and cavities extend into the substrate from a back side of the substrate. Each cavity reaches an associated conductive pad. Protrusions are disposed on the back side of the substrate. A conductive layer covers the walls and bottoms of the cavities. The conductive layer includes portions on the back side, each portion partially located on an associated protrusion and electrically connecting two of the conductive pads.

25 Claims, 3 Drawing Sheets

ELECTRONIC CHIP

CROSS-REFERENCE TO RELATED APPLICATIONS

This application claims priority to French Patent Application No. 1757142, filed on Jul. 27, 2017, which application is hereby incorporated herein by reference.

TECHNICAL FIELD

The present disclosure relates to electronic chips, e.g., chips protected against attacks carried out from the back side.

BACKGROUND

Electronic chips are likely to undergo attacks aiming at determining the operation of the chip and at extracting confidential information therefrom.

A method of pirating information manipulated by integrated circuits comprises etching the back side of the chip, for example, by chemical etching or by chemical-mechanical polishing. This enables to access active portions of the chip, for example, by etching cavities with an ion beam to install therein contacts with components located on the front side. In a first etch step, the pirate may see possible chip protection devices located on the back side and dismantle them before countermeasures are triggered. Such countermeasures may for example be the destruction of the information contained in the chip.

SUMMARY

Thus, an embodiment provides an electronic chip that comprises conductive pads located on the front side of a semiconductor material substrate. Cavities are etched into the substrate from the back side of the substrate. Each cavity reaches a conductive pad. A conductive layer covers the walls and the bottom of the cavities and comprises portions of conductive layer connecting on the back side at least certain cavities two by two. Each conductive layer portion is partially located on a protrusion. A circuit is capable of detecting a variation of an electric characteristic measured between two pads.

According to an embodiment, the length of each protrusion is approximately in the range from 10% to 40% of the distance separating the cavities having the protrusion located therebetween.

According to an embodiment, certain conductive layer portions are interrupted at the level of the lower portion of the protrusion.

According to an embodiment, an insulating material fills the cavities and covers the conductive layer and the back side of the chip, the insulating material being opaque and having a low etch selectivity over the material of the conductive layer.

According to an embodiment, the protrusion is made of the same material as the substrate.

According to an embodiment, the protrusion is made of an electrically-insulating material.

According to an embodiment, the circuit is capable of measuring the resistance between pads and each pad is directly connected to the conductive layer.

According to an embodiment, the circuit is capable of measuring the capacitance between pads and each pad is separated from the conductive layer by a first layer of insulating material.

An embodiment provides an electronic chip manufacturing method comprising: a) forming conductive pads on the front side of a semiconductor substrate; b) etching, from the back side of the substrate, cavities opposite the conductive pads; c) etching the back side of the substrate until the cavities reach the corresponding pads and forming protrusions between cavities; d) covering the back side of the substrate with a conductive layer; and e) etching the conductive layer to form portions, each extending between two cavities, each portion being partially located on a protrusion.

According to an embodiment, step e) of etching the conductive layer also comprises forming portions of the conductive layer which are interrupted at the level of the protrusion.

According to an embodiment, the protrusions are formed by etch mask portions.

According to an embodiment, a first layer of insulating material is deposited on the walls and the bottom of the cavities between steps c) and d).

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
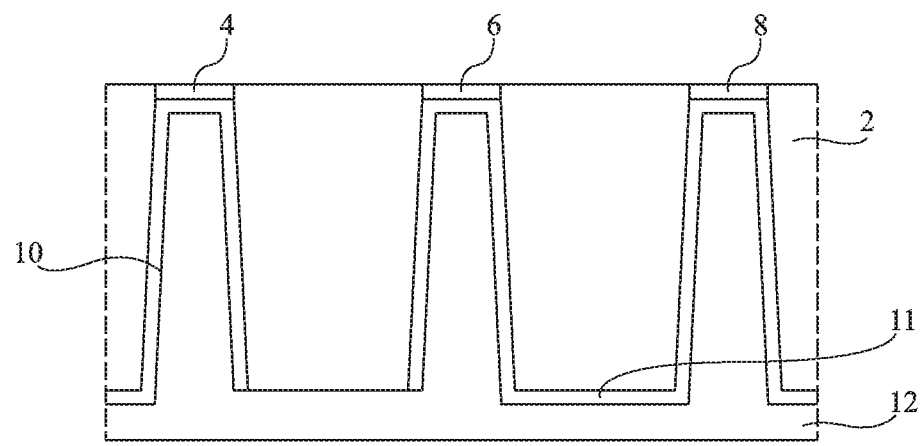
FIG. 1 is a simplified cross-section view of a chip protected against back side attacks.

The same elements have been designated with the same reference numerals in the various drawings and, further, the various drawings are not to scale. For clarity, only those steps and elements which are useful to the understanding of the described embodiments have been shown and are detailed. In particular, the electric characteristic (capacitance, resistance . . . ) measurement circuit is not shown.

In the following description, when reference is made to terms qualifying absolute positions, such as terms "front", "back", etc., or relative positions, such as terms "upper", "lower", etc., or to terms qualifying orientation, such as term "horizontal", "vertical", reference is made to the orientation of the concerned elements in the drawings. Unless otherwise specified, expressions "approximately" and "substantially" mean to within 10%, preferably to within 5%.

FIG. 1 is a cross-section view of a chip protected against back side attacks.

The chip comprises a substrate 2 made of semiconductor material, for example, silicon. Conductive pads, three of which, 4, 6, and 8 are shown in FIG. 1, are located on the front side of substrate 2. Substrate 2 also comprises a cavity, open from the back side, opposite each conductive pad 4, 6, and 8. Conductive pads 4, 6, and 8 form the bottom of the corresponding cavities. The walls and the bottom of the cavities are covered with a conductive layer 10 having portions 11 extending over the back side. Portions 11 of conductive layer 10 connect certain cavities two by two. In FIG. 1, pads 6 and 8 are directly connected by a portion 11 of conductive layer 10. Similarly, pad 4 is directly connected to conductive layer 10 and is for example connected to a conductive pad, not shown.

The chip further comprises a circuit, not shown, capable of measuring an electric characteristic between two conductive pads and of detecting a variation of this characteristic. Such a measurement may be performed occasionally or continuously. The electric characteristic is, for example, the resistance or the capacitance between pads. In the case where the characteristic is the capacitance, a layer of electrically-insulating material, not shown, is located between conductive layer 10 and the cavity walls and bottom to form a capacitor between each conductive pad and conductive layer 10. In the case where the characteristic is the resistance, the pads are directly connected to conductive layer 10 as shown in FIG. 1.

A layer 12 of insulating material fills the cavities and covers conductive layer 10 and the back side of the substrate.

If a conductive connection portion 11 is destroyed, for example, by attacks such as those previously described, the chip detects a variation of the characteristic measured between the two corresponding cavities and triggers a countermeasure. To avoid such a countermeasure, a pirate may attempt removing insulating layer 12 and exposing layer 10 without breaking the connections or reforming the broken connections before activating the chip. An etching of layer 12 of insulating material causes the beginning of the etching of conductive layer 10, once the layer has been reached. However, the surface of each conductive portion 11 is sufficiently large for the portion not to be totally etched before the detection of conductive layer 10 by the pirate and the stopping of the etching. Thus, the pirate may discover, from remainders of conductive 10, the connections which have been destroyed and may reconnect the conductive layers of the cavities before activating the chip. The attack will then not be detected by the measurement circuit.

Figure 2:
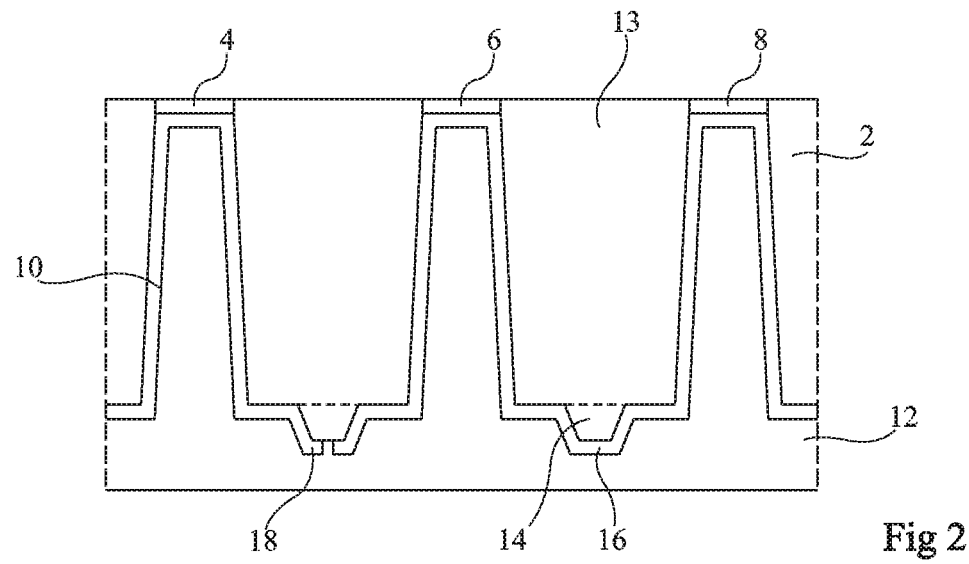
FIG. 2 is a simplified cross-section view of an embodiment of a chip protected against back side attacks.

FIG. 2 is a simplified cross-section view of an embodiment of a device of protection of a chip against back side attacks. FIG. 2 shows elements similar to those of FIG. 1 designated with the same reference numerals.

FIG. 2 shows three conductive pads 4, 6, and 8 on the front side of semiconductor substrate 2 as well as the corresponding cavities, as previously described.

The cavities delimit in the plane of FIG. 2 substrate blocks 13. Blocks 13 for example contain on their upper surface side active components of the chip such as transistors, capacitors, etc. The back side of each block 13 is planar and is partially shown in dotted lines in FIG. 1. Protrusions 14 are located on the back side of blocks 13. Protrusions 14 are for example located substantially in the middle of the back sides of blocks 13. The length of the protrusion is defined by the length of the lower horizontal portion of the protrusion in the plane of FIG. 2, the lower portion of the protrusion being the face opposed to the substrate. Specifically, the length of the protrusion covered by a portion of the conductive layer extending between two cavities is the dimension of the protrusion in the direction between the two cavities. The length of the protrusions is for example in the range from 10% to 40% of the distance between cavities. The width of the protrusion, that is, the dimension of the protrusion in the direction orthogonal to the plane of FIG. 2, has a value greater than or equal to the length of the protrusion. The protrusions are for example made of the material of substrate 2. As a variation, the protrusions may be made of an insulating material, such as silicon oxide or silicon nitride.

The protrusions are located on the backside of the substrate. Specifically, the protrusions are located on portions of the backside of the substrate between adjacent cavities. The portions of the backside of the substrate on which the protrusions are located are for example substantially planar. The dimensions of each protrusion in a plane parallel to the backside of the substrate are inferior to the dimensions of the portion on which this protrusion is located.

Conductive layer 10 covers the cavity walls and bottom and portions of layer 10 extend on the back side of substrate 2 between cavities. Each portion of layer 10 extending between the cavities is partially located on a protrusion 14. The portions of layer 10 are divided into two categories, shown in FIG. 2 and designated with reference numerals 16 and 18.

Portion 16 of layer 10, which extends between the cavities of pads 6 and 8, is continuous and electrically connects pads 6 and 8.

Portion 18 of layer 10, which extends between the cavities of pads 4 and 6, is similar to the portion located between pads 6 and 8 but is however interrupted at the level of the lower portion of the protrusion.

A circuit, not shown, capable of measuring an electric characteristic is connected to the different pads having portions 16 and 18 extending therebetween to detect variations of the value of the measured characteristic. For example, the circuit can detect the interruption of the electric connection connecting pads 6 and 8. For example, the circuit may also detect whether pads 4 and 6, having an interrupted portion 18 extending therebetween, are electrically connected.

The chip may further be covered on its back side with an insulating layer 12. Layer 12 is for example made of an opaque polymer, to make it difficult or even impossible to distinguish the connections between cavities without removing the polymer. The polymer is for example opaque to visible and to infrared radiation. The polymer is for example also selected so that the polymer etching products rapidly etch conductive layer 10, which avoid stopping the etching before etching the conductive layer.

Substrate 2 may, further, comprise decoy conductive pads which are not associated with a cavity and decoy cavities which are not associated with a conductive pad. Such decoy elements, not shown, may mislead a pirate attempting to understand the operation of the chip and of its device of protection against back side attacks.

Figure 3:
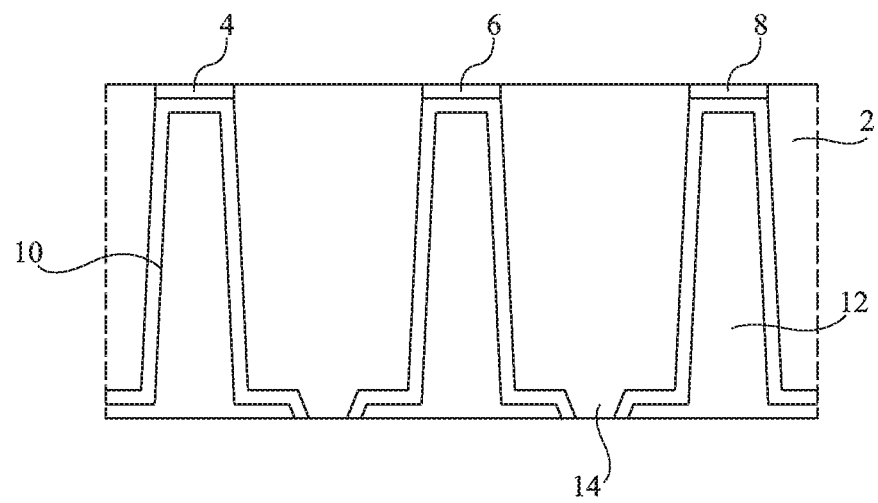
FIG. 3 is a cross-section view of the chip of FIG. 2 after an etching performed from the back side.

FIG. 3 illustrates the chip of FIG. 2 during a back side attack. More particularly, the attack undergone by the chip comprises a planar etching of the back side.

During the attack, insulator layer 12 is for example etched by chemical etching. The portion of conductive layer 10 covering the protrusion has a small surface area and is thus not immediately detected. Further, the material of layer 12 has for example been selected so that its etch products rapidly etch the material of layer 10. The portion of layer 10 covering the protrusion is rapidly and totally etched before layer 10 is detected by the pirate and the etching is stopped. The connections between conductive pads are thus destroyed and the attack can be discovered on activation of the chip. Further, the only elements distinguishing continuous portions 16 and interrupted portions 18 are located on the protrusions and are etched during the attack. It is then no longer possible to distinguish cavities having a portion of continuous conductive layer 16 extending therebetween and cavities having a portion of interrupted conductive layer 18 extending therebetween. The pirate cannot determine which cavities should be reconnected to avoid triggering the countermeasures, and which cavities should not be.

FIGS. 4A to 4E illustrate steps of manufacturing of the chip of FIG. 2.

Figure 4A:
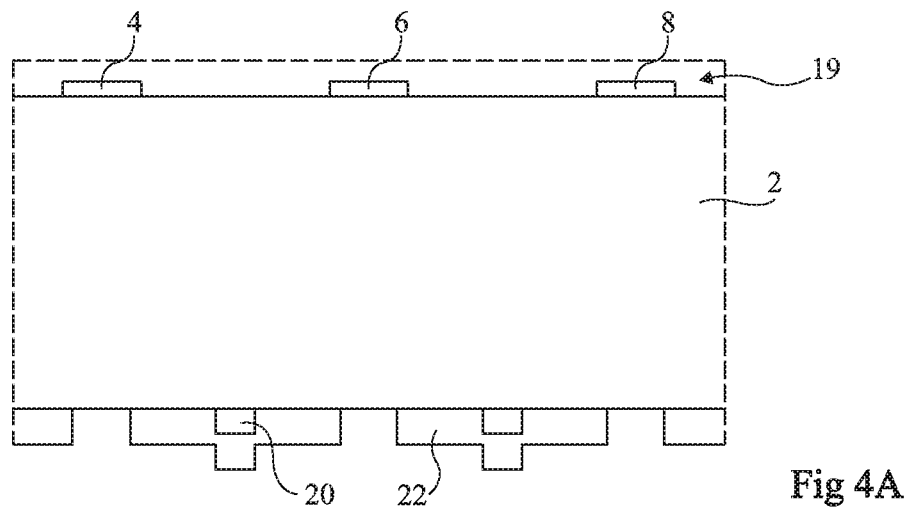
FIGS. 4A to 4E are simplified cross-section views illustrating steps of manufacturing of the chip of FIG. 2.

FIG. 4A illustrates an initial manufacturing step. The chip comprises a semiconductor substrate 2, for example, made of silicon, and having a thickness for example in the range from 150 to 200 µm. Conductive pads 4, 6, and 8, for example corresponding to metallizations of the lower level of an interconnection structure 19, are located on the front side of substrate 2. Between these pads, adequate semiconductor structures have been previously formed.

A first mask 20 is formed on the back side of substrate 2 at the locations intended for the protrusions. First mask 20 is for example made of silicon oxide or of silicon nitride. A second mask 22 is formed on the back side. Second mask 22 comprises openings at the level of the areas of substrate 2 where the cavities will be etched, opposite the conductive pads.

Figure 4B:
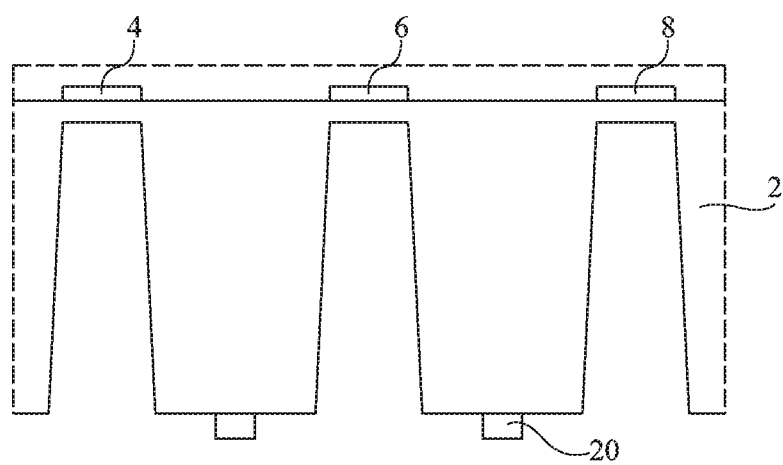

At the step of FIG. 4B, cavities are etched opposite conductive pads 4, 6, and 8 through the openings of second mask 22. The etching is stopped before reaching the conductive pads, for example, at a distance in the range from 1 to 10 µm from the conductive pads. Second mask 22 is then removed.

Figure 4C:
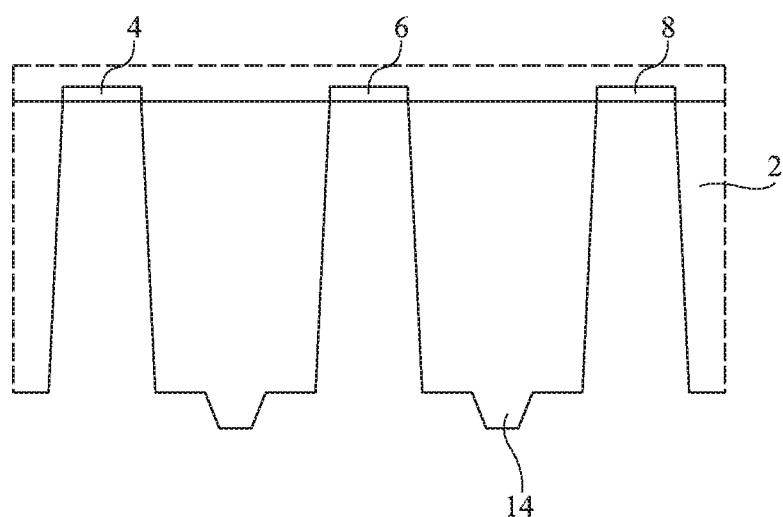

At the step of FIG. 4C, substrate 2 is etched once again from the back side. The substrate is etched until the cavities reach the conductive pads and the portions of the back side protected by first mask 20 form protrusions 14. The first mask is then removed.

The thickness of protrusions 14 is for example in the range from 3 to 30 µm.

Figure 4D:
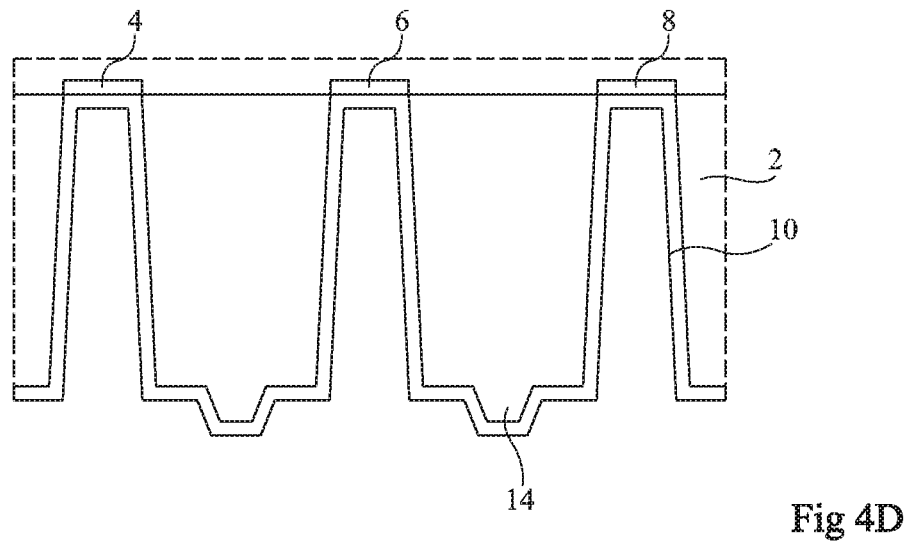

At the step of FIG. 4D, a conductive layer 10 is deposited all over the back side of the chip, for example, by physical vapor deposition or by electrochemical deposition. In the case of a capacitance measurement, a layer of electrically-insulating material, not shown, is formed on the cavity walls and bottoms before the forming of conductive layer 10.

The layer 10 is deposited uniformly. The thickness of the conductive layer 10 is for example in the range from 0.1 to 3 µm. The thickness of each protrusion is for example in the range from 5 to 10 times the thickness of the conductive layer 10.

Figure 4E:
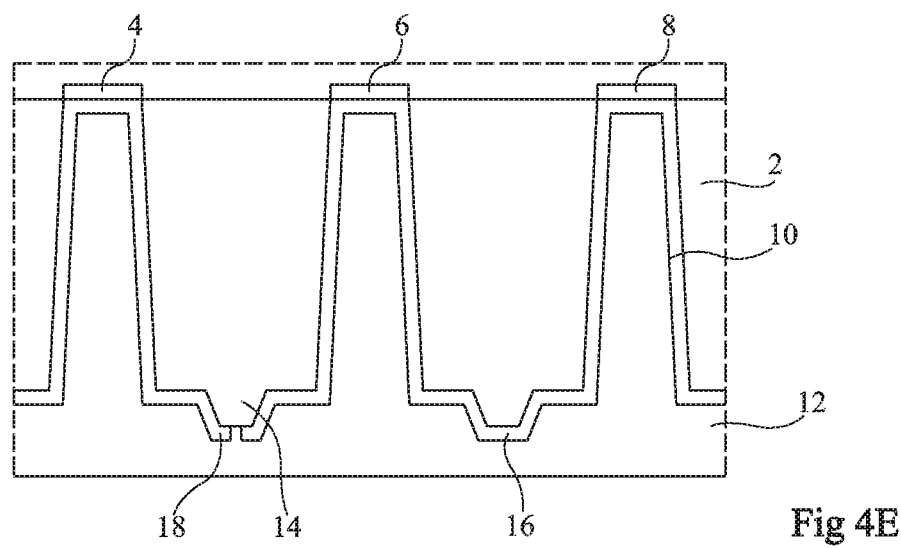

At the step of FIG. 4E, the conductive layer is removed from selected locations, for example, by chemical etching, of the back side of the substrate to form portions of conductive layer 10 extending between cavities. The portions may be continuous portions 16 or portions 18 interrupted at the level of the corresponding protrusion 14.

As a variation, protrusion 14 may be made of a material different from the material of substrate 2. The protrusion is for example made of an insulating material such as silicon oxide or silicon nitride. Protrusion 14 may then be formed by first mask 20. The method then does not comprise the step of FIG. 4C, which comprises removing the first mask. The etching of the cavities performed at the step of FIG. 4B reaches the conductive pads.

An advantage of the manufacturing methods described herein is that they only comprise usual manufacturing steps. They have a low cost.

One example of where embodiments of the invention can be implemented is with secured non-volatile memory devices. Features of the electronic circuit described herein can be used with any memory to store information securely. Examples of such memory include non-volatile memories such as Flash, EEPROM, phase change memories and such.

In one implementation, the detection of an intrusion can trigger a mechanism to erase the memory contents.

In other embodiments, features of the invention can be implemented with secured ICs, such as secure microcontrollers for IC-cards or smart cards (e.g., a bank card or a SIM-card for mobile phones). In general, no card is required. As an example, a SIM-card for a mobile phone can be replaced by an "embedded SIM" where the sole secured integrated circuit chip is directly soldered to the product board. As other examples, electronic chips as discussed herein can be used in banking, secure mobile transactions, automotive for connectivity, Internet of things devices, and identification (e.g., documents such as passports or tags for products such as printer cartridges). Many other implementations are also envisioned.

Specific embodiments have been described. Various alterations, modifications, and improvements will readily occur to those skilled in the art.

Various embodiments with different variations have been described hereinabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electronic chip comprising:
   a substrate made of semiconductor material;
   a plurality of conductive pads located on a front side of the substrate;
   a plurality of cavities extending in the substrate from a back side of the substrate, each cavity vertically aligned directly below and reaching an associated conductive pad, the cavities defining portions of the substrate;
   a plurality of protrusions disposed on the back side of the substrate, each protrusion disposed on an associated portion of the substrate, each protrusion made of the same semiconductor material as the semiconductor material of the substrate;
   a conductive layer covering walls and bottoms of the cavities, the conductive layer comprising portions on the back side, each portion partially located on an associated protrusion and electrically connecting two of the conductive pads; and
   a detection circuit capable of detecting a variation of an electric characteristic measured between electrically connected conductive pads.

2. The electronic chip of claim 1, wherein each protrusion has a length that is approximately 10% to approximately 40% of a distance separating the cavities having the protrusion located therebetween.

3. The electronic chip of claim 1, wherein certain portions of the conductive layer are interrupted at a location on the associated protrusion.

4. The electronic chip of claim 1, further comprising an insulating material filling the cavities.

5. The electronic chip of claim 4, wherein the insulating material covers the conductive layer and the back side.

6. The electronic chip of claim 4, wherein the insulating material is opaque to visible and to infrared radiation.

7. The electronic chip of claim 4, wherein the insulating material has a low etch selectivity relative to the conductive layer.

8. The electronic chip of claim 1, wherein each protrusion is made of an electrically-insulating material.

9. The electronic chip of claim 1, wherein each pad is directly connected to the conductive layer and wherein the detection circuit is capable of measuring a resistance between pads.

10. The electronic chip of claim 1, wherein each pad is capacitively connected to the conductive layer and wherein the detection circuit is capable of measuring a capacitance between pads.

11. The electronic chip of claim 10, further comprising an insulating layer disposed between each pad and the conductive layer.

12. The electronic chip of claim 1, wherein each conductive pad includes a top surface and a bottom surface, the bottom surface positioned between the top surface and the substrate, wherein each cavity is vertically aligned directly below a top surface of an associated conductive pad and each cavity extending vertically to a bottom surface of the associated conductive pad.

13. An electronic chip comprising:
a substrate made of semiconductor material;
integrated circuitry disposed at a front side of the substrate;
a plurality of conductive pads disposed at the front side of the substrate;
a plurality of cavities extending from a back side of the substrate, each cavity vertically aligned directly below and reaching an associated conductive pad, the cavities defining non-planar portions of the back side of the substrate;
a conductive layer covering walls and bottoms of the cavities, portions of the conductive layer overlying the non-planar portions of the back side, each portion electrically connecting two of the conductive pads; and
an insulating material filling the cavities and covering the conductive layer and the back side of the substrate.

14. The electronic chip of claim 13, wherein the integrated circuitry includes a detection circuit capable of detecting a variation of an electric characteristic measured between electrically connected conductive pads.

15. The electronic chip of claim 14, wherein each pad is directly connected to the conductive layer and wherein the detection circuit is capable of measuring a resistance between pads.

16. The electronic chip of claim 14, wherein each pad is capacitively connected to the conductive layer and wherein the detection circuit is capable of measuring a capacitance between pads.

17. The electronic chip of claim 13, wherein the integrated circuitry includes a non-volatile memory circuit.

18. The electronic chip of claim 13, wherein the integrated circuitry includes a secured microcontroller.

19. The electronic chip of claim 13, wherein the insulating material is opaque to visible and to infrared radiation and has a low etch selectivity relative to the conductive layer.

20. An electronic chip comprising:
a substrate made of semiconductor material;
a plurality of conductive pads at a first side of the substrate;
a plurality of cavities extending in the substrate from a second side of the substrate, each cavity vertically aligned directly below and contacting an associated one of the plurality of conductive pads;
a plurality of protrusions disposed on the second side of the substrate, each protrusion disposed on a portion of the substrate between adjacent ones of the plurality of cavities, each protrusion made of the same semiconductor material as the semiconductor material of the substrate;
a conductive layer covering sidewalls of the plurality of cavities and contacting the plurality of conductive pads, the conductive layer comprising first portions covering all of the associated one of the plurality of protrusions and second portions comprising gaps exposing portions of the associated one of the plurality of protrusions; and
a detection circuit capable of detecting a variation of an electric characteristic measured between adjacent ones of the conductive pads.

21. The electronic chip of claim 20, further comprising an insulating material filling the plurality of cavities and the gaps, wherein the insulating material covers the conductive layer.

22. The electronic chip of claim 21, wherein the insulating material has a low etch selectivity relative to the conductive layer.

23. The electronic chip of claim 20, further comprising a capacitor disposed between adjacent pads of the plurality of conductive pads, wherein the detection circuit is configured to measure the capacitance of the capacitor.

24. The electronic chip of claim 20, further comprising a resistor disposed between adjacent pads of the plurality of conductive pads, wherein the detection circuit is configured to measure the resistance of the resistor.

25. The electronic chip of claim 20, wherein each conductive pad includes a top surface and a bottom surface, the bottom surface positioned between the top surface and the substrate, wherein each cavity vertically is aligned directly below a top surface of an associated conductive pad and each cavity extending vertically to a bottom surface of the associated conductive pad.

* * * * *